Figure 1:
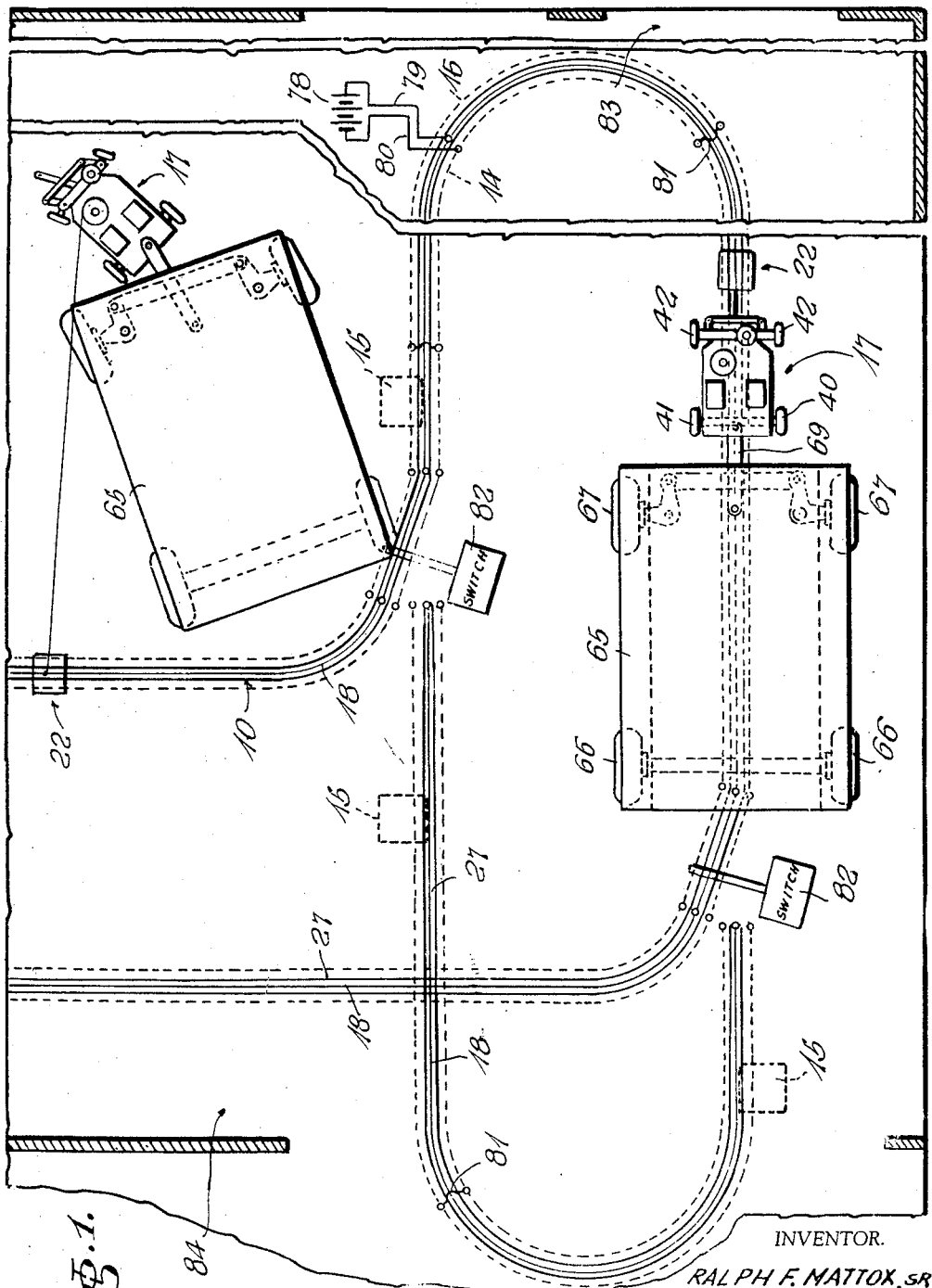

Sept. 8, 1959  R. F. MATTOX, SR  2,903,526
TRANSPORTATION SYSTEM

Filed Oct. 16, 1956  3 Sheets-Sheet 1

INVENTOR.
RALPH F. MATTOX, SR.
BY
Felix A. Russell
ATTORNEY

Sept. 8, 1959
R. F. MATTOX, SR
2,903,526
TRANSPORTATION SYSTEM
Filed Oct. 16, 1956
3 Sheets-Sheet 2
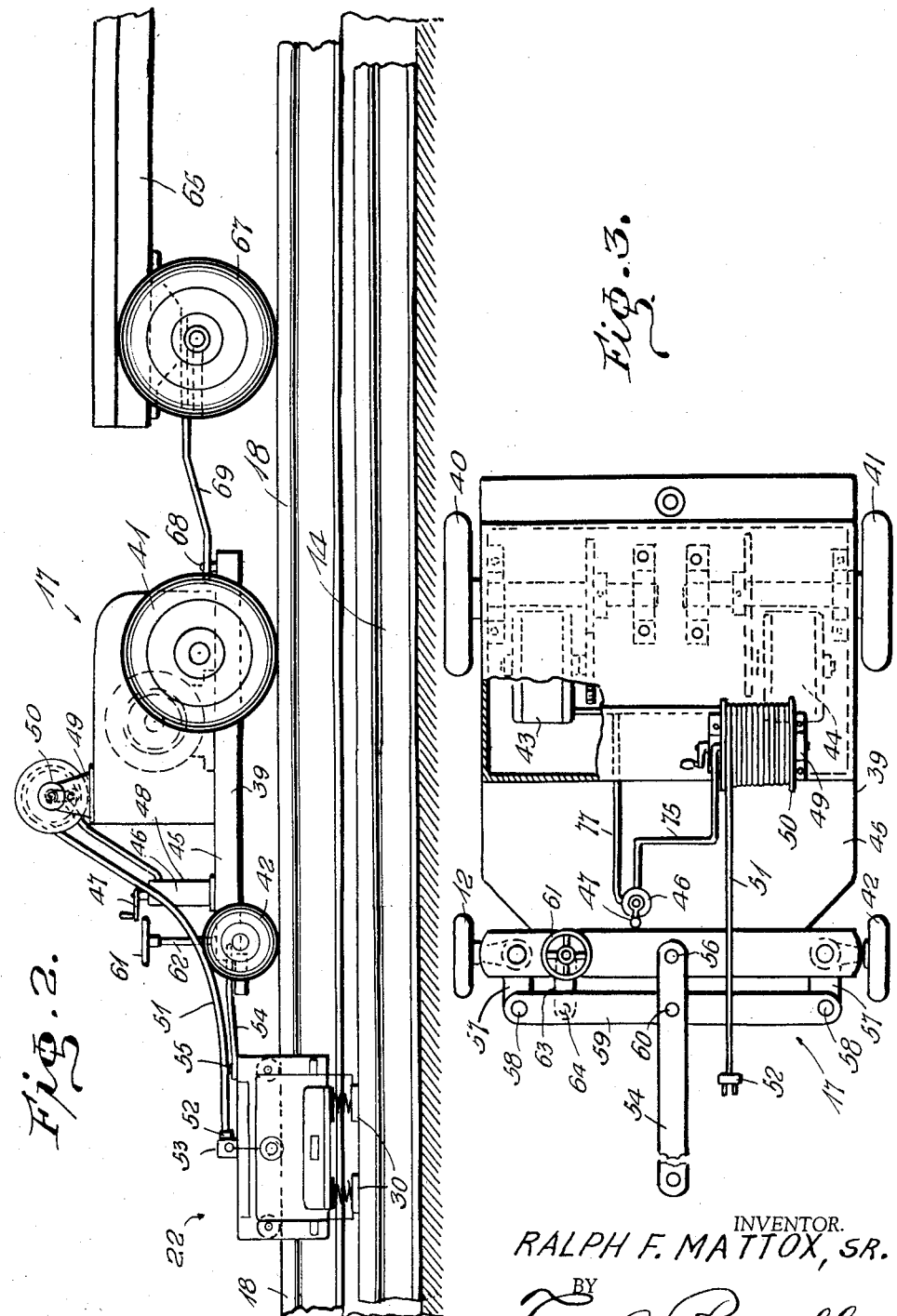
INVENTOR.
RALPH F. MATTOX, SR.
BY
Felix A. Russell
ATTORNEY

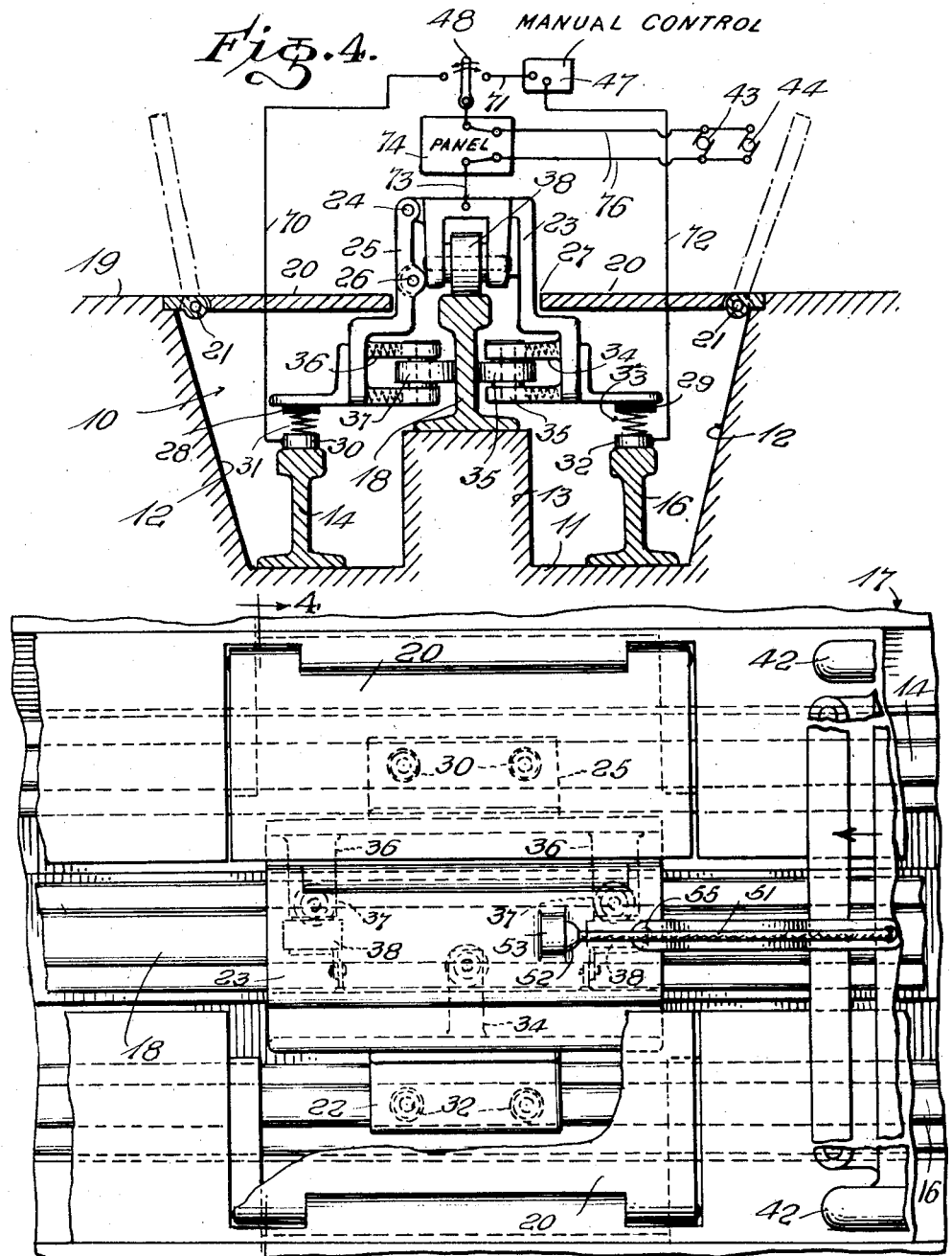

United States Patent Office 2,903,526
Patented Sept. 8, 1959

1

2,903,526

TRANSPORTATION SYSTEM

Ralph Franklin Mattox, Sr., Baltimore, Md.

Application October 16, 1956, Serial No. 616,251

7 Claims. (Cl. 191—49)

The present invention relates to a transportation system and it consists in the combinations, constructions and arrangements of parts herein described and claimed.

Generally there is provided a transportation system which includes a conduit having located therein a pair of "live" rails and a return or ground rail. A novel power collector assembly is associated with the rails and is provided with means whereby it may be quickly assembled upon or disassembled from the rails, a feature of the invention being a novel hinged frame construction provided with a locking pin forming a part of the invention and also provided with guide rollers which bear against the ground rail whereby to act as a steering means for a novel tractor which is connected with the power collector assembly and which, in turn, is adapted to move one or more freight trucks. One of the live rails is provided with a conventional block system whereby the tractor and its freight trucks may be connected to the power collector assembly and be moved along the path of the conduit automatically. A novel manual control is also provided whereby the tractor may be connected to the other of the live rails and at such time be manually controlled. There is also provided upon the tractor a novel retractable electrical connector which connects with the power collector assembly and which permits the tractor to be operated independently in an area away from the conduit while receiving its electrical power from the power collector assembly. Other novel features are also included.

It is an object of the invention to provide a novel transportation system of that type including an underground conduit and a power collector assembly adapted to be partially encompassed by said conduit.

Another object of the invention is to provide a novel compact power assembly having novel means for mounting and dismounting the same upon certain rails forming a part of the invention.

Still another object of the invention is to provide, in a system of the character set forth, a novel hinged frame and latch means therefor, both forming parts of the invention.

A further object of the invention is to provide a novel tractor forming a part of the invention.

Still another object of the invention is to provide novel steering and guiding means for a tractor forming part of the invention.

Another object of the invention is to provide, in a device of the character set forth, novel driving means for a tractor.

A still further object of the invention is to provide a novel electrical system providing both automatic and manual operation for a system of the character set forth.

Other and further objects of the invention will become apparent from a reading of the following specification taken in conjunction with the drawings, in which:

Figure 1 is a plan view, partly broken away, illustrating a transportation system in accordance with the present invention, Figure 2 is a fragmentary side elevational view illustrating a power collector assembly, a tractor and a trailer truck all forming parts of the invention, Figure 3 is a plan view, somewhat enlarged and partly broken away, of a tractor as shown in Figures 1 and 2, Figure 4 is a sectional view, partly schematic and taken generally along line 4—4 of Figure 5, and Figure 5 is a fragmentary plan view of the device illustrated in Figure 4.

Referring more particularly to the drawings, there is shown therein a conduit generally indicated at 10 and having a bottom wall 11 and upwardly and outwardly extending side walls 12. Centrally positioned upon the bottom wall 11 is a vertical extension 13 which extends longitudinally throughout the conduit 10.

Mounted upon the bottom wall 11 adjacent one of the side walls 12 is a live rail 14 which is associated with a block system of any conventional character, such block system being indicated at 15 in Figure 1. Since such block system forms no part of the present invention except as hereinafter referred to, details of the electrical system of such system are not thought to be necessary and hence are omitted in the present application. Adjacent the other wall 12 and lying upon the bottom wall 11 is a live rail 16 which is continuous throughout its length and which is utilized for manually controlling a tractor generally indicated at 17 and the details of which will be set forth with more particularity hereinbelow.

A return or ground rail 18 is mounted upon the extension 13 and its upper face lies in a plane which is coextensive with the plane of the ground 19 in which the conduit 10 is formed.

The conduit 10 is provided at certain strategic points along its length with doors 20 which are hingedly connected, as indicated at 21, adjacent the upper edges of the walls 12.

A power collector assembly is generally indicated at 22 and is shown in greater detail in Figures 4 and 5. The assembly consists of a frame having a relatively fixed side 23 to which is pivotally connected along one upper edge thereof, as indicated at 24, a movable side 25, the latter being normally connected to the fixed side by means of a pin 26. The upper portion of the frame extends through a longitudinally extending opening 27 in the ground above the conduit 10 or between the covers 20 as illustrated in Figure 4, while the lower portion of the frame extends outwardly and has affixed to its underside adjacent each side thereof pairs of insulation blocks 28 and 29. Brushes 30 are held against the rail 14 by means of springs 31 associated with the insulation blocks 28 and like brushes 32 are held in contact with the rail 16 by springs 33 associated with the blocks 29.

Extending inwardly from the fixed side 23 of the frame is a yoke 34 in which is mounted a roller 35 which is spring-biased into contact with one side of the rail 18. A pair of yokes 36 extend inwardly from the movable portion 25 of the frame and each has mounted therein a roller 37 which is spring-biased against the other side of the rail 18. Centrally mounted in the upper portion of the frame is a pair of dependent rollers 38 which normally lie upon the upper face of the rail 18.

The tractor 17 is provided with a body 39 having a pair of drive wheels 40 and 41 and a pair of forwardly located steering wheels 42, such wheels 40, 41 and 42 being adapted to ride upon the road bed or ground 19. An electric motor 43 is mounted in the body 39 and connected in any suitable manner to drive the wheel 40 while a like motor 44 is provided in the body 39 and connected to drive the wheel 41. The forward portion of the body 39 provides a platform 45 having mounted thereon a control housing 46 provided at its upper end with a manual control lever 47 and having extending therefrom a manually controlled switch 48.

Mounted in a suitable frame 49 upon the body 39 is a reel 50 upon which is wound a cable 51 having a removable connector 52 at its forward end, such connector 52 being engageable with a proper socket 53 mounted upon the power collector assembly frame, as indicated in Figure 5.

A draw bar 54 is connectible at its forward end to the power collector assembly, as indicated at 55, and is pivotally connected at its rearward end, as indicated at 56, to the forward end of the body 39. The wheels 42 are each mounted upon a bell crank lever 57 whose forward arms are pivotally connected, as indicated at 58, to a cross bar 59 which, in turn, is pivotally connected, as indicated at 60, to the draw bar 54. A steering wheel 61 is affixed to the upper end of a steering shaft 62 whose lower end has affixed thereto a forwardly extending arm 63 which is pivotally connected at its forward end, as indicated at 64, to the draw bar 59.

A trailer truck 65 provided with supporting wheels 66 and forwardly located steering wheels 67 is detachably connected, as indicated at 68, to the rearward end of the trailer 17, by means of a draw bar 69.

The brushes 30 are connected by suitable wires 70 which extend through the cable 51 to the switch 48 which is, in turn, connected by a wire 71 to the manual control 47, the latter being connected by a wire 72 to the brush 32, the wire 72 likewise extending through the cable 51.

A wire 73 connects the frame of the power collector assembly 22 with a panel 74 preferably located within the housing 46, the wire 73 likewise extending through the cable 51. The inner end of the cable 51 after encircling the drum 50 extends, as indicated at 75, to the housing 46. From the panel 74 a pair of wires 76 extend through a cable 77 to supply the electric motors 43 and 44.

A source of electrical energy is indicated at 78 and a wire 79 interconnects the same with the ground rail 18 while a wire 80 connects the source 78 with the rail 14. The rails 14 and 16 are interconnected at suitable points by wires 81. Suitable switch mechanisms of any suitable character and forming no part of the present invention are indicated at 82 and such switches, it will be understood, may be remotely controlled either from a central switching point or by means of the block system indicated at 15.

A first area which may be a wharf or the like is indicated generally at 83 while a second area which may be, for example, a warehouse or the like is indicated at 84.

In operation, when it is desired to move freight or the like from a first area 83 to a second area 84, it is only necessary to connect the drawbar 54 of the tractor 17 to the power collector assembly 22 as shown, for example, in Figure 2, and to thereafter connect one or more trailer trucks 65 in a train to the rear of the tractor 17 by means of the drawbars 69. There will thus be assembled a power collector assembly 22, a tractor 17 and one or more trailer trucks 65, as shown in the lower portion of Figure 1. When the trucks 65 have been loaded, it is only necessary for the operator to move the switch 48 from its neutral position to connection with the wire 70. This will cause the closing of an electrical circuit including the source of power 78, the wire 80, the rail 14, the brush 30, the wire 70, the switch 48, one of the wires 76, the motors 43 and 44, the other wire 76, the frame of the power collector assembly, the roller 38, the return rail 18 and the wire 79. The motors 43 and 44 will now act to move the tractor thereby pushing ahead of the tractor the power collector assembly 22 and drawing after the tractor trailer truck 65. The block system 15, being connected in any proper manner to the rail 14, will thereupon act to control the movement of the train or trains in their passage to the area 84 in conventional manner. Likewise, the switches 82 may be remotely controlled or controlled by the passage of the train, likewise in conventional manner. Hence it will be unnecessary for an attendant to accompany such trains when they are in passage with the block system in operation.

When, however, it is necessary or desirable for an attendant to manually control the movement of the tractor 17, it is only necessary for the attendant to position himself upon the platform 45 of the tractor 17 and to thereupon move the switch 48 to its contact with the wire 71 (see Figure 4) whereupon an electrical circuit will be closed from the source of power 78 and which includes the wires 80, the rail 14, the wire 81, rail 16, the brush 32, the wire 72, the manual control 47, the wire 71, the switch 48, one of the wires 76, the motors 43 and 44, the other wire 76, the wire 73, the frame of the power collector assembly 22, the roller 38, the rail 18 and the wire 79. In this condition, it will be apparent that the operator may utilize the manual control 47 to move the tractor 17 at his will regardless of the block system 15 which is not now in operation.

When it is desired to remove the power collector assembly from its connection with the rails 14, 16 and 18, it is only necessary to first position the same at a location along the conduit 10 where the covers 20 may be lifted out of normal position, whereupon the pin 26 may be removed and the movable portion 25 of the frame of the collector assembly may be moved in a clockwise direction, as viewed in Figure 4, pivoting upon its hinge 24. The roller 37 no longer having contact with the rail 18, the entire assembly may be removed for inspection, repair or the like after which, by reversing the order just above described, the assembly 22 may be replaced and the covers 20 moved back to horizontal position.

When a train has reached, for example, a warehouse where it is desired to unload the truck 65 at a position remote from the conduit 10, the drawbar 54 may be disconnected from the power collector assembly 22 whereupon the tractor 17 may be manually moved to a distance from the conduit 10, as indicated in the upper portion of Figure 1, it being apparent that the cable 51 may be paid out from the drum 50, thus maintaining electrical connection to the motors 43 and 44. To return to normal operation, it is merely necessary to manually control the tractor 17 back to a position where it may again be coupled by means of the drawbar 54 to the power collector assembly 22. It will also be apparent that when it is desired to entirely disconnect a tractor 17 from its power collector assembly 22, not only will the drawbar 54 be disconnected but the cable 51 may be disconnected from the socket 53, as shown in Figure 5.

While but one form of the invention has been shown and described herein, it will be readily apparent to those skilled in the art that many minor modifications may be made in the invention without departing from the spirit thereof or from the scope of the appended claims.

What is claimed is:

1. A transportation system comprising a conduit having a centrally disposed longitudinally extending slot in the upper side thereof, an electrical power-supplying rail mounted in either side of said conduit, an electrical ground rail centrally mounted in said conduit, a power collector assembly movably mounted on said rails and extending upwardly through said slot, a tractor, a link interconnecting said tractor and said collector assembly, electrical means carried by said tratcor for moving the same, means for removably connecting trailer trucks to said tractor, manually operable control means carried by said tractor and electrically connected with one of said power-supplying rails for controlling the electrical means for moving the tractor, other control means electrically connected with the other power-supplying rail for moving the tractor, and a switch carried by the tractor for selectively electrically connecting said manual and said other control means with their respective power-supplying rails.

2. A system as defined in claim 1 wherein said power collector assembly comprises a frame having a fixed portion and a movable portion, a hinge connection between said portions, and a pin normally maintaining said portions in locked position upon said ground rail.

3. A system as defined in claim 1 wherein said power collector assembly comprises a frame having a fixed portion and a movable portion, a hinge connection between said portions, a pin normally maintaining said portions in locked position upon said ground rail, and spring-pressed brushes carried by the lower end of said frame in normal contact with said power-supplying rails.

4. The invention set forth in claim 3 further characterized by a plurality of inwardly directed spring-pressed rollers carried by said frame in normal contact with opposite sides of said ground rail, and a plurality of dependent rollers normally in contact with the upper face of said ground rail.

5. The invention as set forth in claim 1 wherein said conduit is provided with pairs of oppositely disposed covers hingedly connected at the upper edge portions of said conduit and movable upwardly to open position.

6. In a system of the character described, a pair of live power-supplying rails, a ground rail, a power collector assembly movable upon said power-supplying rails, a tractor a removable link interconnecting said tractor and said assembly, motors in said tractor for moving the same, a drum mounted on said tractor, a cable retractably mounted on said drum and electrically connected to said motors and having a free end removably electrically connected to said power collector assembly, means electrically connecting one of said power-supplying rails through said collector assembly with said motors to automatically operate the same, manual control means carried by said tractor and electrically connected to the other power-supplying rail for operating said motors, and switching means means for selectively connecting the motor with the manual control means and the automatically controlled means with their respective power-supplying rails.

7. The invention set forth in claim 6 wherein said tractor is provided with a pair of steering wheels and manual means for controlling said wheels.

References Cited in the file of this patent
UNITED STATES PATENTS

| | | |
|---|---|---|
| 746,556 | Morgan | Dec. 8, 1903 |
| 760,643 | Newman | May 24, 1904 |
| 1,010,504 | Lindsley | Dec. 5, 1911 |
| 1,064,141 | Gorham | June 10, 1913 |
| 1,481,405 | Anglada | Jan. 22, 1924 |
| 1,808,277 | Wood | June 2, 1931 |
| 2,068,403 | Ekstrom | Jan. 19, 1937 |
| 2,468,158 | Bartholomew | Apr. 26, 1949 |
| 2,631,853 | Haynes et al. | Mar. 17, 1953 |
| 2,685,003 | Barnes | July 27, 1954 |
| 2,703,534 | Copeland | Mar. 8, 1955 |